United States Patent [19]

Hamilton et al.

[11] 3,897,285

[45] July 29, 1975

[54] PYROTECHNIC FORMULATION WITH FREE OXYGEN CONSUMPTION

[75] Inventors: Brian K. Hamilton; Eugene F. Garner, both of Saugus, Calif.

[73] Assignee: Allied Chemical Corporation, New York, N.Y.

[22] Filed: Sept. 10, 1973

[21] Appl. No.: 395,480

[52] U.S. Cl. ............... 149/41; 149/40; 149/46; 149/61; 149/75; 149/77; 149/83; 149/85; 280/150 AB; 102/39

[51] Int. Cl. ............................................. C06b 15/00

[58] Field of Search ............ 149/45, 42, 83, 40, 43, 149/85, 41, 46, 44, 76, 61, 75, 77; 280/150 AB; 102/39

[56] References Cited
UNITED STATES PATENTS

| | | | |
|---|---|---|---|
| 3,532,359 | 10/1970 | Teague et al. | 280/150 AB |
| 3,618,980 | 11/1971 | Leising et al. | 102/39 X |
| 3,618,981 | 11/1971 | Leising et al. | 280/150 AB |
| 3,647,393 | 3/1972 | Leising et al. | 102/39 X |

*Primary Examiner*—Stephen J. Lechert, Jr.
*Attorney, Agent, or Firm*—John P. Kirby, Jr.

[57] ABSTRACT

This pyrotechnic composition is adapted, upon combustion, for generating a low-flame temperature, non-toxic gas to inflate a vehicle safety bag. The pyrotechnic composition comprises: a fuel, such as a carbonaceous material, aluminum or magnesium; a coolant, such as a metallic carbonate; and an inorganic oxidizer, such as a metal chlorate, a metal perchlorate, a metal nitrate, ammonium chlorate, ammonium perchlorate or ammonium nitrate. In some instances, a metallo-organic compound, such as nickel formate, may be used as the fuel in mixture with or in place of the carbonaceous material, or the aluminum or the magnesium.

11 Claims, No Drawings

PYROTECHNIC FORMULATION WITH FREE OXYGEN CONSUMPTION

BACKGROUND OF THE INVENTION

This invention relates to a pyrotechnic composition adapted for generating a gas upon combustion. Among the uses for such a gas is to inflate a safety bag in a vehicle to restrain movement of an occupant in the vehicle in the event of collision.

It is necessary that such a pyrotechnic composition be able to meet certain criteria in order to be adapted for use with a vehicle safety bag. The pyrotechnic composition must be able to withstand storage in an environment from approximately −40°F. to approximately +220°F. It is also necessary that the composition be capable of being ignited rapidly, for example, within a few milliseconds, and that it be capable of being totally ignited to produce a gas. It is necessary that the gas produced have not more than a negligible amount of toxic gas, such as nitrogen oxides or carbon monoxide, at relatively low temperatures, such as less than 2000°F. when burned at pressures of from 100 to 20,000 pounds per square inch.

Prior art pyrotechnic or propellant compositions were developed for rockets and did not meet the need for a composition which would generate a low-flame temperature, non-toxic gas adapted for inflating a vehicle safety bag. See: U.S. Pat. No. 2,929,697 to Perry and 2,994,598 to Dickey. This is understandable because the compositions were intended for applications where low-flame temperature was not an objective. In addition, many of the compositions disclosed in the prior art produce a toxic gas, such as some of the compositions in U.S. Pat. No. 3,020,180 to Morello and 3,047,524 to Bowman.

When work began for the purpose of developing a pyrotechnic composition for use to generate a gas to inflate a vehicle safety bag, it was found that a useful composition comprised about 25% nickel formate as the fuel and 75% potassium perchlorate as the oxidizer. The problem with this prior pyrotechnic composition adapted for use with a vehicle safety bag was that, upon combustion, it produced free oxygen. The free oxygen raised the danger of flammability with the material of which the safety bag was made.

SUMMARY OF THE INVENTION

The pyrotechnic composition of this invention is adapted, upon combustion, for generating a low-flame temperature, non-toxic gas which avoids the presence of excess free oxygen. This gas is useful for inflating various devices, such as a safety bag in a vehicle. A safety bag is inflated to restrain the movement of an occupant of the vehicle in event of collision. In general, the pyrotechnic composition comprises a fuel, a coolant and an inorganic oxidizer.

The fuel is selected from a group consisting of a carbonaceous material, aluminum, and magnesium. In some instances, a metallo-organic compound selected from the group consisting of nickel formate, iron oxalate, magnesium oxalate and aluminum formate, may also be used as the fuel in mixture with or in place of the carbonaceous material, or the aluminum or the magnesium. The coolant is a metal carbonate selected from the group consisting of nickel carbonate and magnesium carbonate. The inorganic oxidizer is selected from the group consisting of a metal chlorate, a metal perchlorate, a metal nitrate, ammonium chlorate, ammonium perchlorate and ammonium nitrate. A typical composition comprises: a mixture of carbon and nickel formate as the fuel, nickel carbonate as the coolant, and potassium chlorate as the oxidizer. This composition, upon combustion, generates a gas which eliminates the presence of free oxygen because the excess oxygen has been consumed by the carbonaceous material. Elimination of the excess oxygen is important to reduce flammability with the safety bag.

DETAILED DESCRIPTION

This pyrotechnic composition is adapted, upon combustion, for generating a low-flame temperature, non-toxic gas. The composition comprises: a fuel selected from the group consisting of a carbonaceous material (such as carbon, carbon black or lamp black), aluminum and magnesium; a metallic carbonate as the coolant selected from the group consisting of nickel carbonate and magnesium carbonate; and an inorganic oxidizer selected from the group consisting of an alkali metal chlorate such as potassium chlorate or sodium chlorate, an alkali metal perchlorate such as potassium perchlorate or sodium perchlorate, an alkali metal nitrate such as potassium nitrate or sodium nitrate, ammonium chlorate, ammonium perchlorate, and ammonium nitrate. In some instances, a metalloorganic compound, selected from the group consisting of nickel formate, iron oxalate, magnesium oxalate and aluminum formate, may be used as the fuel, in place of or in mixture with the carbonaceous material, aluminum or magnesium.

More specifically, the pyrotechnic composition of this invention may comprise by weight: from less than 1 to about 10% of the fuel such as carbon and preferably from about 2 to about 6% of the fuel such as carbon; from less than 1 to about 50% of the metallic carbonate such as nickel carbonate ($NiCO_3$) and preferably from about 15 to about 45% of the metallic carbonate such as nickel carbonate, as the coolant; and from about 35 to about 75% of the inorganic oxidizer such as potassium chlorate ($KClO_3$) and preferably from about 45 to about 70% of the inorganic oxidizer such as potassium chlorate. In some instances, from less than 1 to about 30% of the metallo-organic compound such as nickel formate $Ni(HCO_2)_2$ and preferably from about 15 to about 25% of the metallo-organic compound such as nickel formate may be used in mixture with or in place of the carbon as the fuel.

The following are typical examples of this pyrotechnic composition.

EXAMPLE A

The composition comprises by weight: about 6% carbon as the fuel; about 44% nickel carbonate as the coolant; and about 50% potassium chlorate as the oxidizer.

EXAMPLE B

The composition comprises by weight: about 6% carbon as the fuel; about 44% magnesium carbonate as the coolant; and about 50% potassium chlorate as the oxidizer.

EXAMPLE C

The composition comprises by weight: about 4% carbon mixed with about 19½% nickel formate, this mixture being the fuel; about 20% nickel carbonate as the coolant; and about 56½% potassium chlorate as the oxidizer.

The compositions in the foregoing examples each produce a gas having a flame temperature from about 1500°F. to less than 2000°F.

The free oxygen formed by the combustion of the oxidizer, such as potassium chlorate ($KClO_3$), is consumed by the fuel such as the carbonaceous material which acts as a scavenger, forming carbon dioxide ($CO_2$) and hydrogen. In instances where the metalloorganic compound is used as the fuel, the combustion products are carbon dioxide and water. The heat which is evolved in this combustion is cooled by the decomposition of the nickel carbonate ($NiCO_3$) forming carbon dioxide. As a result, the pyrotechnic composition of this invention eliminates the presence of excess oxygen over and above the level of oxygen normally found in the atmosphere. This elimination of excess oxygen is important because it reduces flammability of the pyrotechnic composition with the material of the safety bag. The metallo-organic compounds have been found to have some binding characteristics in the composition in certain instances depending upon the particular formulations. But, the primary purpose of the metallo-organic compound is as a fuel. The pyrotechnic composition of this invention does not need a binder, but a binder may be used as an optional component. If a binder is desired, an organic binder such as a polycarbonate or an acetal resin, may be used.

It has been found useful to pelletize the pyrotechnic composition of this invention in order to achieve a predictable combustion performance of the composition, rather than to use the composition in powder form. Pelletizing can be achieved by severely mixing the powdered ingredients and then using a pill press to produce pellets, or by granulating the powdered mixture, extruding it through a screen and forming noodles. Pelletizing has been found advantageous because of the following undesirable characteristics of a mixed powder. The powder tends to separate, with the oxidizer at the bottom and the fuel at the top. When the powder burns, it burns with different characteristics depending upon the degree to which the powder mixture is homogeneous. In addition, the powder may be loosely packed or it may become tightly packed which also affects its burning or combustion characteristics. The result is that inconsistent results are sometimes obtained when using the composition in powder form. When using the composition in pellet form, more consistent results are generally produced. Optionally, an organic lubricant, such as stearic acid or Carbowax (a trade name of Union Carbide Corporation for polyethylene glycols), may be added for pelletizing.

As an example, 85 grams of a pyrotechnic composition comprising: 4% carbon black; 20% nickel carbonate; 19½% nickel formate; and 56½% potassium chlorate ($KClO_3$), was used in an inflator unit. This 85 grams of composition produced sufficient gas to inflate a three cubic foot bag in 35 milliseconds to 32½ psig of pressure with a bag surface temperature under 190°F. The gas generated was found to contain about 21 mole percent of oxygen, 15 mole percent of water and 64 mole percent of carbon dioxide.

The pyrotechnic compositions of this invention have been found to produce a gas having a low-flame temperature and a negligible amount of toxic gases, such as nitrogen oxides or carbon monoxide.

We claim:

1. A pyrotechnic composition adapted, upon combustion, for generating a low-flame temperature, non-toxic gas, said composition prior to combustion comprising: a fuel; a metal carbonate selected from the group consisting of nickel carbonate and magnesium carbonate which acts as a coolant; and an inorganic oxidizer selected from the group consisting of a metal chlorate, a metal perchlorate, a metal nitrate, ammonium chlorate, ammonium perchlorate and ammonium nitrate.

2. The pyrotechnic composition according to claim 1 wherein said fuel is selected from the group consisting of a carbonaceous material, aluminum and magnesium.

3. The pyrotechnic composition according to claim 1 wherein said fuel is a metallo-organic compound selected from the group consisting of nickel formate, iron oxalate, magnesium oxalate and aluminum formate.

4. The pyrotechnic composition according to claim 1 wherein said fuel is a mixture of: a compound selected from the group consisting of a carbonaceous material, aluminum and magnesium; and a metallo-organic compound selected from the group consisting of nickel formate, iron oxalate, magnesium carbonate, magnesium oxalate and aluminum formate.

5. The pyrotechnic composition according to claim 1 comprising: from less than 1 to about 10% of a carbonaceous material which acts as the fuel; from less than 1 to about 50% of a metallic carbonate which acts as the coolant; and from about 35 to about 75% of an inorganic oxidizer.

6. The pyrotechnic composition according to claim 1 comprising: from less than 1 to about 10% of a carbonaceous material and from less than 1 to about 30% of a metallo-organic compound, said carbonaceous material and said metallo-organic compound acting as the fuel; from less than 1 to about 50% of a metallic carbonate as the coolant; and from about 35 to about 75% of an inorganic oxidizer.

7. The pyrotechnic composition according to claim 1 comprising: from about 2 to about 6% carbon as the fuel; from about 15 to about 45% nickel carbonate as the coolant; and from about 45 to about 70% potassium chlorate as the oxidizer.

8. The pyrotechnic composition according to claim 1 comprising: from about 2 to about 6% carbon and from about 15 to about 25% nickel formate, said carbon and said nickel formate as the fuel; from about 15 to about 35% nickel carbonate as the coolant; and from about 45 to about 70% potassium chlorate as the oxidizer.

9. The pyrotechnic composition according to claim 1 comprising: about 4% carbon and about 19½% nickel formate as the fuel; about 56½% potassium chlorate as the oxidizer and about 20% nickel carbonate as the coolant.

10. The pyrotechnic composition according to claim 1 in pellet form.

11. A process for generating a low-flame temperature, non-toxic gas to inflate a vehicle safety bag, comprising:

intermixing a fuel; a coolant selected from the group consisting of nickel carbonate and magnesium carbonate; and an inorganic oxidizer selected from the group consisting of a metal chlorate, a metal perchlorate, a metal nitrate, ammonium chlorate, ammonium perchlorate and ammonium nitrate; into a composition; and causing combustion of said composition after said intermixing of said fuel, coolant and oxidizer.

* * * * *